United States Patent [19]

Ohishi et al.

[11] Patent Number: 5,314,954
[45] Date of Patent: May 24, 1994

[54] PROCESS FOR PREPARING AROMATIC POLYESTER-POLYSTYRENE BLOCK COPOLYMERS

[75] Inventors: Hiroshi Ohishi; Shinji Inaba; Masao Kimura; Koichi Fujishiro; Masanao Kawabe, all of Kawasaki; Takumi Tanaka, Uji; Keizo Kyuda, Uji; Souichiro Kishimoto, Uji; Takamasa Owaki, Uji; Akio Motoyama, Uji, all of Japan

[73] Assignees: Unitika Ltd., Amagasaki; Nippon Steel Corporation; Nippon Steel Chemical Co. Ltd., Tokyo, all of Japan

[21] Appl. No.: 997,367

[22] Filed: Dec. 23, 1992

Related U.S. Application Data

[63] Continuation-in-part of Ser. No. 779,493, Oct. 24, 1991, abandoned.

[30] Foreign Application Priority Data

Oct. 24, 1990 [JP] Japan .................. 2-284470
Sep. 18, 1991 [JP] Japan .................. 3-265368
Oct. 3, 1991 [JP] Japan .................. 3-281942

[51] Int. Cl.$^5$ .......................... C08F 293/00
[52] U.S. Cl. ......................... 525/132; 525/90
[58] Field of Search ......................... 525/132

[56] References Cited

U.S. PATENT DOCUMENTS

4,980,410 12/1990 Fryd et al. .
4,980,418 12/1990 Sasaki et al. .

FOREIGN PATENT DOCUMENTS

58-157844 9/1983 Japan .
58-225113 12/1983 Japan .
1-129011 5/1989 Japan .

Primary Examiner—Patricia A. Short
Attorney, Agent, or Firm—Armstrong, Westerman, Hattori, McLeland & Naughton

[57] ABSTRACT

A process is disclosed for preparing of aromatic polyester-polystyrene block copolymers which comprises subjecting preferentially styrene polymers (A) having terminal functional groups reactive with acid chloride groups and an excess of aromatic dicarboxylic acid dihalides (C) to condensation and then subjecting continuously the resultant mixture and aromatic dihydroxy compounds (B) to interfacial polymerization at the ratio (A)/[(B)+(C)] by weight of 5/95 to 80/20, without separating reaction products of styrene polymers (A) and aromatic dicarboxylic acid dihalides (C), and the block copolymers thus prepared contain a small amount of uncopolymerized styrene polymers, have long aromatic polyester segments, show low birefringence, good transparency, exceptionally low birefringence, low melt viscosity, and good mechanical strength, and are particularly useful as materials for optical instruments.

2 Claims, 1 Drawing Sheet

PROCESS FOR PREPARING AROMATIC POLYESTER-POLYSTYRENE BLOCK COPOLYMERS

This application is a continuation-in-part of application Ser. No. 07/779,493, filed Oct. 24, 1991, now abandoned.

FIELD OF THE INVENTION AND RELATED ART STATEMENT

This invention relates to a process for preparing aromatic polyester-polystyrene block copolymers which are useful as materials for optical instruments.

Aromatic polyesters, in general, are highly transparent and suitable as materials for optical instruments and also have excellent heat resistance and mechanical strength. They are, however, difficult to process because of their high melt viscosity. In addition, the stress from thermal processing such as injection molding generates strain in the resins and such strain induces birefringence in the molded articles, causing readout errors and noises in optical disks and optical guard protective membranes or increases in the transmission loss in optical fibers.

Remedial processes are known for the aforesaid problems; for example, one is based on the chemical combination of aromatic polyesters (hereinafter often abbreviated as PAr) and styrene polymers (hereinafter often abbreviated as PS), positive birefringence against negative, and the other is based on the addition of such chemically combined PS-PAr resins as compatibilizer to PS/PAr blends. Processes for the preparation of aromatic polyester-polystyrene block copolymers are disclosed, for example, in U.S. Pat. No. 4,980,410, Japan Kokai Tokkyo Koho Nos. 58-157,844 (1983) and 58-225,113 (1983). According to these processes, unsaturated groups are introduced to the ends of aromatic polyesters and then allowed to polymerize with styrene monomers to yield aromatic polyester-polystyrene block copolymers. In consequence, the proportion of styrene monomers not copolymerizing with the terminally unsaturated polyesters increases and the resulting polymers as formed show low mechanical strength. A separating step will therefore be required for the removal of such uncopolymerized polystyrene and this will make the process unsuitable for commercial application. According to a process disclosed in Japan Kokai Tokkyo Koho No. 1-129,011 (1989), styrene monomer and allylamine are polymerized and melt-blended with aromatic polyesters at high temperature (260°-340° C.) to prepare aromatic polyester-polystyrene block copolymers. With this process, however, the polyester chain is first cleaved and then copolymerized with allylamine-modified styrene polymers and the resulting polymers contain short aromatic polyester segments and do not have sufficient strength.

In addition, U.S. Pat. No. 4,980,418 discloses a process which comprises forming styrene polymers having terminal carboxylic acid chloride groups with the use of an azo-containing dicarboxylic acid dichloride as a polymerization initiator and subjecting the styrene polymers to polycondensation while using them as a part of material of polyester. In this process, however, upon completion of the polymerization, the styrene polymers having the unstable acid chloride groups must be separated and purified in order to remove unreacted initiator and monomers. Thus, activity of each functional group is lowered causing a problem that the proportion of uncopolymerized styrene polymer increases in the product polymers.

OBJECT AND SUMMARY OF THE INVENTION

This invention offers a solution to the aforesaid problems in aromatic polyester-polystyrene block copolymers for molding optical instruments and its object is to provide aromatic polyester-polystyrene block copolymers with a minimum content of uncopolymerized styrene polymers.

Another object of this invention is to provide a process for preparing aromatic polyester-polystyrene block copolymers having long aromatic polyester segments.

A further object of this invention is to provide a process for preparing aromatic polyester-polystyrene block copolymers with high transparency, particularly low birefringence, low melt viscosity, and good mechanical strength.

This invention accordingly relates to a process for preparing aromatic polyester-polystyrene block copolymers which comprises subjecting preferentially styrene polymers (A) having terminal functional groups reactive with acid halide groups and an excess of aromatic dicarboxylic acid dihalides (C) to polycondensation and then subjecting continuously the resultant mixture and aromatic dihydroxy compounds (B) to interfacial polymerization at the ratio (A)/[(B)+(C)] by weight of 5/95 to 80/20, without separating reaction products of styrene polymers (A) and aromatic dicarboxylic acid dihalides (C).

The styrene polymers (A) to be used in this invention have functional groups at the ends or at the ends and at some internal sites, preferably at one or both ends, more preferably at both ends for enhanced reactivity.

The functional groups in the styrene polymers (A) are capable of reacting with the acid halide groups of the aromatic dicarboxylic acid dihalides (C) used for the polycondensation. Such a functional group includes a hydroxyl group (—OH) or amino group (—NH$_2$). In the cases where the styrene polymers (A) have terminal functional groups of low reactivity, the aromatic dihydroxy compounds (B) react preferentially with the aromatic dicarboxylic acid dihalides (C), thereby a large proportion of the unreacted styrene polymers (A) is remained. Accordingly, the functional groups are preferably aromatic hydroxyl groups or aromatic amino groups with equal or higher reactivity in comparison with the aromatic dihydroxy compounds (B).

The styrene monomers making up the styrene polymers (A) include styrene, alkylstyrenes such as o-, m-, and p-methylstyrene, o-, m-, and p-ethylstyrene, and p-tert-butylstyrene, halostyrenes such as o-, m-, and p-chlorostyrene, dichlorostyrenes, monobromostyrene, and dibromostyrenes, and α-methylstyrene, and a mixture thereof. The styrene polymers may be copolymers of styrene monomers with 0 to 50%, preferably 0 to 20%, of other vinyl monomers, for example, methacrylate esters, acrylate esters, vinyl acetate, butadiene, maleic acid anhydride and acrylonitrile, for property improvement.

The styrene polymers (A) desirably have a number average molecular weight $\overline{Mn}$ of 1,000 or more to 200,000 or less as determined by gel permeation chromatography (GPC). Polymers with $\overline{Mn}$ of less than 1,000 do not yield copolymers of satisfactory mechanical properties while polymers with $\overline{Mn}$ in excess of 200,000 present difficulties in the synthesis of copolymers. It is also desirable to control the ratio of the weight average molecular weight $\overline{Mw}$ to $\overline{Mn}$ ($\overline{Mw}/\overline{Mn}$) at 4.0 or less, more desirably 1.0 to 3.0. Styrene polymers with $\overline{Mw}/\overline{Mn}$ in excess of 4.0 cannot be used advantageously as they do not produce copolymers of uniform molecular weight.

The styrene polymers (A) having terminal functional groups to be used in this invention are prepared by polymerizing styrene monomer or styrene monomer and other vinyl monomers with the use of a polymerization initiator or a chain-transfer agent having identical or different functional groups or by allowing these functional group-containing compounds to react with styrene living polymers, although the preparatory methods are not limited to those mentioned above.

Typical examples are cited below for the preparation of the styrene polymers (A) having terminal functional groups.

Processes are known for the preparation of carboxyl-containing styrene polymers by the polymerization of styrene monomer with the use of a carboxyl-containing polymerization initiator. The processes for preparing carboxyl-terminated styrene polymers described in Japan Kokai Tokkyo Koho Nos. 62-235, 302 (1987) and 63-83, 107 (1988) may be adopted.

Styrene polymers with terminal hydroxyl groups, for example, those with phenolic hydroxyl groups, are synthesized by esterifying the aforesaid carboxyl-terminated styrene polymers with an excess of a diphenol such as 2,2-bis(4-hydroxyphenyl)propane (hereinafter referred to as "bisphenol A") in solvent in the presence of a suitable catalyst and an acid scavenger.

Alcoholic hydroxyl-terminated styrene polymers can be prepared by the polymerization of styrene monomer with the use of an alcoholic hydroxyl-containing initiator such as 2,2′-azobis(2-cyanopropanol) and 2,2′-azobis{2-[1-(2-hydroxyethyl)-2-imidazolin-2-yl]propane} dihydrochloride or a hydroxyl-containing chain-transfer agent such as mercaptoethanol and mercaptopropanediol.

Amino-terminated styrene polymers can be prepared by the amidation of the aforesaid carboxyl-terminated styrene polymers with an excess of a diamine such as 4,4′-diaminodiphenyl ether in a solvent in the presence of a suitable catalyst and an acid scavenger or by the radical polymerization of styrene monomer with the use of an amino-containing initiator (for example, VA-088 available from Wako Pure Chemical Industries, Ltd.).

It is to be understood here that the functional group-terminated styrene polymers (A) are not limited to those prepared as cited above and styrene polymers having terminal groups reactive with acid halide groups are applicable.

The functional groups may be linked to the ends of the styrene polymers directly or through other intervening groups. For example, the aforesaid hydroxyl-terminated styrene polymers are treated with a dicarboxylic acid dihalide such as terephthaloyl dichloride to yield acid halide-terminated styrene polymers or acid halide-terminated styrene polymers are treated with a dihydroxy compound such as bisphenol A to yield hydroxyl-terminated styrene polymers. Most desirable is at least one functional group selected from the group of amino and phenolic hydroxyl groups.

The aromatic dihydroxy compounds (B) to be used in this invention have two hydroxyl groups linked to an aromatic ring structure and their examples include bisphenol A, bis(4-hydroxyphenyl)methane, bis(4-hydroxy-3-methylphenyl)methane, bis(4-hydroxy-3,5-dichlorophenyl)methane, bis(4-hydroxy-3,5-dibromophenyl)methane, bis(4-hydroxy-3,5-difluorophenyl)methane, bis(4-hydroxyphenyl) ketone, bis(4-hydroxyphenyl) sulfide, bis(4-hydroxyphenyl) sulfone, 4,4′-dihydroxydiphenyl ether, 1,1-bis(4-hydroxyphenyl)ethane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxynaphthyl) propane, bis(4-hydroxyphenyl)phenylmethane, bis(4-hydroxyphenyl) diphenylmethane, bis(4-hydroxyphenyl)-(4′-methylphenyl)methane, 1,1-bis(4-hydroxyphenyl)-2,2,2-trichloroethane, bis(4-hydroxyphenyl)-(4′-chlorophenyl)methane, 1,1-bis(4-hydroxyphenyl)cyclohexane, bis(4-hydroxyphenyl)cyclohexylmethane, 4,4′-dihydroxybiphenyl, 2,2′-dihydroxybiphenyl, 2,6-dihydroxynaphthalene, hydroquinone, resorcinol, 2,6-dihydroxytoluene, 2,6-dihydroxychlorobenzene, 3,6-dihydroxytoluene, and a mixture thereof. Of these, bisphenol A is preferable.

The aromatic dicarboxylic acid dihalides (C) to be used in this invention have two acid halide groups linked to an aromatic ring structure and their examples include terephthaloyl chloride, terephthaloyl bromide, isophthaloyl chloride, and isophthaloyl bromide, and their ring-halogenated derivatives, 4,4′-biphenyldicarboxylic acid dihalides, 4,4′-benzophenonedicarboxylic acid dihalides, 4,4′-diphenylsulfonedicarboxylic acid dihalides, 4,4′-diphenyletherdicarboxylic acid dihalides, 2,6-naphthalenedicarboxylic acid dihalides, and a mixture thereof. Of these, terephthaloyl chloride and isophthaloyl chloride mixed at a ratio of 25:75 to 75:25 are particularly desirable. The halogen atom in the acid halides may be chlorine, bromine, or iodine, chlorine being preferable. It is allowable for the aromatic dihydroxy compounds (B) or aromatic dicarboxylic acid dihalides (C) to contain aliphatic dicarboxylic acid dihalides or aliphatic dihydroxy compounds in small quantities.

The proportion of the styrene polymers (A), aromatic dihydroxy compounds (B), and aromatic dicarboxylic acid dihalides (C) may be varied in a wide range. It is, however, necessary to control the content of styrene polymers at 5 to 80% by weight in order to obtain good optical and mechanical properties. For this purpose, the ratio by weight of the styrene polymers (A) to the sum of the aromatic dihydroxy compounds (B) and the aromatic dicarboxylic acid dihalides (C) or (A)/[(B)+(C)] is controlled in the range from 5/95 to 80/20, preferably from 20/80 to 70/30. The use of less than 5% of the styrene polymers cannot lower the birefringence of the copolymers sufficiently while the use of more than 80% decreases the toughness of the copolymers. The aromatic dihydroxy compounds (B) and the aromatic dicarboxylic acid dihalides (C) are used in roughly equimolar quantities. In the cases where the styrene polymers (A) have acid halide-reactive functional groups such as amino and hydroxyl groups, it is desirable to use the aromatic dicarboxylic acid dihalides (C) in that much molar excess. It is, however, hardly necessary to take this manipulation into account when the molecular weight of the styrene polymers (A) is sufficiently high.

After preferential reaction of the styrene polymers (A) and the excess of aromatic dicarboxylic acid dihalides (C) in an organic solvent which is immiscible with water, the interfacial polymerization of this invention is continuously effected by stirring a mixture of the resultant solution and an aqueous alkaline solution of the aromatic dihydroxy compounds (B), without separating reaction products of styrene polymers (A) and aromatic dicarboxylic acid dihalides (C) from the resultant solution.

The preferential reaction of the styrene polymers (A) having the terminal functional groups with the aromatic dicarboxylic acid dihalides (C) is carried out with stirring at 2° to 80° C., preferably 5° to 50° C., for 1 minute to 2 hours. In this reaction, a base or a mixture of bases selected from an organic base such as triethylamine and pyridine and an inorganic base such as sodium hydroxide and calcium hydroxide may be added for smooth progress of the reaction. And, reaction products in this reaction are condensation products of the styrene polymers (A) and the aromatic dicarboxylic acid dihalides (C), namely styrene polymers (A') in which the terminal functional groups of the styrene polymers (A) are converted to acid halide groups. It is preferable to conduct the reaction in the absence of the aromatic dihydroxy compounds (B). The aromatic dicarboxylic acid dihalides (C) are used in excess in this reaction and an amount thereof is more than a necessary amount to convert all of the terminal functional groups of the styrene polymers (A) to the acid halide groups, preferably all of a necessary amount to produce copolymers according to the present invention.

Next, the styrene polymers (A') thus obtained, the aromatic dihydroxy compounds (B) and the aromatic dicarboxylic acid dihalides (C) are allowed to be condensed by interfacial polymerization. In this interfacial polymerization, the styrene polymers (A') are used as it is a resultant mixture of the styrene polymers (A) and the aromatic dicarboxylic acid dihalides (C) without separating reaction products, and the aromatic dihydroxy compounds (B) are added into the resultant mixture in order to allow to condense by interfacial polymerization when the aromatic dicarboxylic acid dihalides (C) are sufficient in the resultant mixture, or the aromatic dihydroxy compounds (B) and the aromatic dicarboxylic acid dihalides (C) are added into the resultant mixture in order to allow to condense by interfacial polymerization when the aromatic dicarboxylic acid dihalides (C) are insufficient in the resultant mixture.

The aqueous alkaline solution here is desirably based on sodium hydroxide or potassium hydroxide. The organic solvent is desirably inert to the styrene polymers (A) or (A') and the aromatic dicarboxylic acid dihalides (C), a good solvent of the styrene polymers (A) or (A'), the aromatic dicarboxylic acid dihalides (C), and the product aromatic polyester-polystyrene block copolymers, and completely immiscible with water. Halohydrocarbons, aromatic hydrocarbons, esters, and ketones are useful as such and concrete examples include methylene chloride, chloroform, tetrachloroethane, chlorobenzene, dichlorobenzene, benzene, toluene, xylene, methyl ethyl ketone, and ethyl acetate.

The interfacial polymerization is carried out with stirring at 2° to 50° C., preferably at 5° to 50° C., for 5 minutes to 8 hours.

In the interfacial polymerization of this invention, a quaternary ammonium salt such as trimethylbenzylammonium chloride and triethylbenzylammonium chloride may be added for smooth progress of the polymerization reaction. A monofunctional phenolic compound such as o-phenylphenol and p-tert-butylphenol may also be added for control of the molecular weight.

Alternate reaction of the terminal functional groups in the styrene polymers (A') with the aromatic dihydroxy compounds (B) and the aromatic dicarboxylic acid dihalides (C) in the interfacial polymerization leads to the formation of block copolymers of the styrene polymers and polyesters, that is, aromatic polyester-polystyrene block copolymers. The ratio by weight of the styrene polymer segments (PS) to the polyester segments (PAr) in the aromatic polyester-polystyrene block copolymers depends on the quantities of the raw materials, namely styrene polymers (A), aromatic dihydroxy compounds (B), and aromatic dicarboxylic acid dihalides (C) and the ratio PS/PAr is set in the range from 5/95 to 80/20, preferably from 25/75 to 65/35 from the viewpoint of optical and mechanical properties.

The product block copolymers can be separated and purified by a variety of known procedures. For example, upon completion of the polymerization, the reaction solution is filtered to separate inorganic salts, washed or extracted, if necessary, and then mixed with a poor solvent such as acetone, methanol, hexane, ethanol, cyclohexane, and water to separate the polymers, which are collected by filtration and dried. The uncopolymerized styrene polymers remaining in the block copolymers may be removed by selectively dissolving them in a solvent such as cyclohexane.

It is desirable for the aromatic polyester-polystyrene block copolymers of this invention to have $\overline{Mn}$ of 1,000 to 300,000 as determined by GPC. Block copolymers with $\overline{Mn}$ of less than 1,000 do not show satisfactory properties while those with $\overline{Mn}$ in excess of 300,000 occur as gel and the solvent therein contained becomes difficult to remove.

The aromatic polyester-polystyrene block copolymers of this invention show good flow and high transparency and can be used neat as materials of low birefringece for optical instruments. Moreover, they can be added as compatibilizer in blending of aromatic polyesters and styrene polymers to improve the tensile strength, flexural strength, and flexural modulus of the blends.

DETAILED DESCRIPTION OF THE PREFERRED EMBODIMENTS

Figure 1:
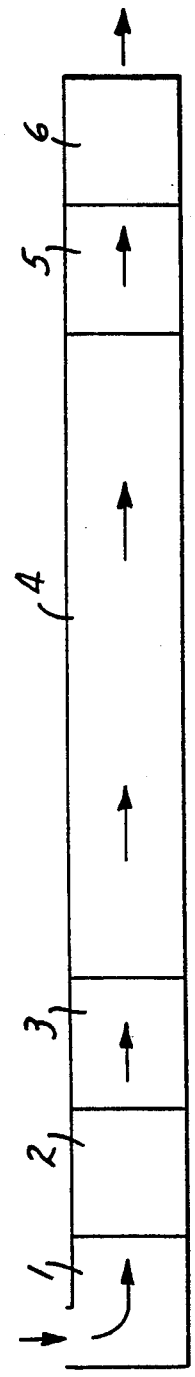
Figure 2:
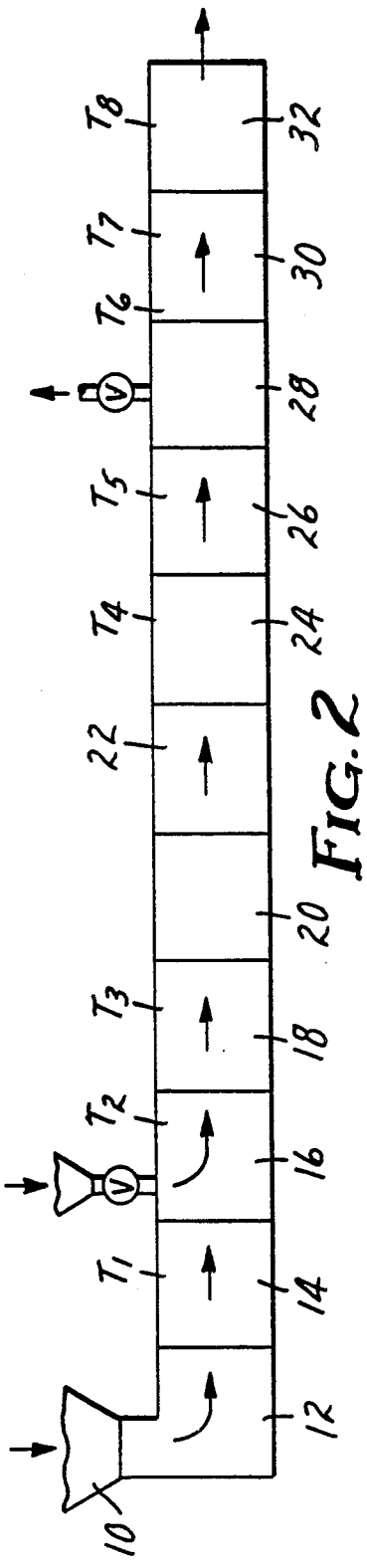
Figure 3:
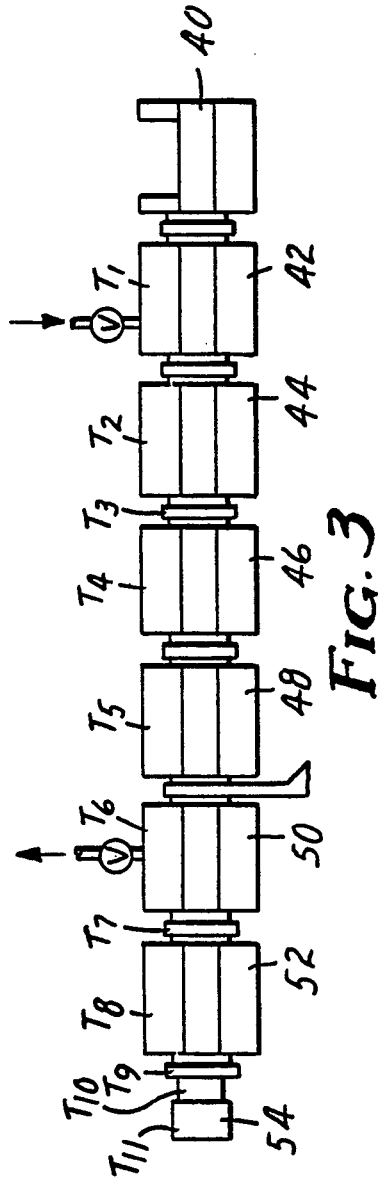

This invention will be explained in detail below with reference to the accompanying examples.

EXAMPLES 1-3

Styrene (100 parts by weight) was subjected to radical polymerization at 90° C. with the use of 4,4'-azobis(4-cyanovaleric acid) (ACVA) as polymerization initiator. ACVA was dissolved in 1,4-dioxane and added in the initial phase of the polymerization and also continuously during the polymerization. Three kinds of carboxyl-terminated styrene polymers (A-1', A-2', and A-3') were obtained by varying the concentrations of initially added ACVA and continuously added ACVA as shown in Table 1.

The molecular weight was measured by a gel permeation chromatograph, Model HLC-802A, manufactured by Toyo Soda Manufacturing Co., Ltd. The average number of carboxyl groups in one polymer molecule was determined by titrating the polymer solution by an aqueous solution of sodium hydroxide with the aid of an automatic titrator, Model GT-05, manufactured by Mitsubishi Kasei Corporation.

Next, the esterification of 100 parts by weight of the above carboxyl-terminated styrene polymer (A-1') with 3 to 7 parts by weight of bisphenol A yielded phenolic hydroxyl-terminated styrene polymers (A-1). Similarly, phenolic hydroxyl-terminated styrene polymers (A-2) and (A-3) were synthesized from the styrene polymer (A-2') and (A-3') respectively. The number of terminal phenolic hydroxyl groups was determined from that of the unreacted carboxyl groups. The results are shown in Table 1.

TABLE 1

| Example No. | 1 | 2 | 3 |
|---|---|---|---|
| Styrene monomer (wt. part) | 100 | 100 | 100 |
| ACVA initially fed (wt. part) | 2.7 | 0.1 | 0.2 |
| Amount of solvent (wt. part) | 83.3 | 13.9 | 13.9 |
| ACVA continuously fed (wt. part) | 5.0 | 4.9 | 0.9 |
| Amount of solvent (wt. part) | 150 | 150 | 50 |
| Continuous feed rate (wt. part/min.) | 0.83 | 0.83 | 0.27 |
| Reaction time (hour) | 3 | 3 | 3 |
| Carboxyl-terminated polystyrene | A-1' | A-2' | A-3' |
| $\overline{Mn}$ | 4,400 | 15,000 | 41,000 |
| $\overline{Mw}$ | 12,000 | 39,000 | 87,000 |
| $\overline{Mw}/\overline{Mn}$ | 2.80 | 2.60 | 2.10 |
| Number of carboxyl groups in one molecule | 1.40 | 1.75 | 1.90 |
| Conversion (%) | 69.3 | 74.4 | 79.5 |
| Phenolic hydroxyl-terminated polystyrene | A-1 | A-2 | A-3 |
| Number of hydroxyl groups in one molecule | 1.20 | 1.65 | 1.80 |

In an egg plant type flask fitted with a stirrer were introduced 100 parts by weight of one of the phenolic hydroxyl-terminated polystyrenes (A-1, A-2, and A-3) and 29 parts by weight each of terephthaloyl chloride and isophthaloyl chloride and dissolved in 1,000 parts by weight of dichloromethane, 0.1 part by weight of calcium hydroxide and 0.01 part by weight of triethylamine were added as catalyst, and the mixture was stirred for 1 hour to condense preferentially the styrene polymers and the acid chlorides, and a resultant mixture including acid chloride-terminated styrene polymers (A'-1~A'-3) was yielded. Then, this resultant mixture was not separated but used continuously for the next reaction. Separately, 630 parts by weight of an aqueous 1N sodium hydroxide solution was placed in a round-bottomed flask, 64 parts by weight of bisphenol A was dissolved in the alkaline solution, 0.05 part by weight of trimethylbenzylammonium chloride was added as catalyst, and to the resultant solution was added the solution of styrene polymer and acid chloride obtained above. Upon completion of the adding, the resultant mixture was subjected to interfacial polymerization with stirring for 2 hours.

Upon completion of the polymerization, the organic layer was neutralized with 630 parts by weight of an aqueous 1N acetic acid solution and washed and the organic layer was extracted and dissolved in 1,000 parts by weight of chloroform. The chloroform solution was passed through a filter with 1-μm pores and the filtrate was added to 10,000 parts by weight of methanol to precipitate the polymers. The polymers were collected by filtration, washed with methanol, and dried in a vacuum dryer.

The determination of $\overline{Mn}$, $\overline{Mw}$, and $\overline{Mw}/\overline{Mn}$ of the polymers thus obtained was made by gel permeation chromatography (GPC). The polymers were identified as aromatic polyester-polystyrene block copolymers by extracting 1 part by weight of the polymers with 50 parts by weight of cyclohexane for 26 hours in a Soxhlet extractor and determining the weight ratio of the cyclohexane-insoluble fraction to the cyclohexane-soluble fraction and the composition of the cyclohexane-insoluble fraction by nuclear magnetic resonance (NMR) with the aid of an instrument, Model JNM-EX40, manufactured by Jeol Ltd. The uncopolymerized styrene polymers are soluble in cyclohexane. The results obtained in Examples 1 to 3 are shown in Table 2.

TABLE 2

| Example No. | 1 | 2 | 3 |
|---|---|---|---|
| $\overline{Mn}$ | 12,000 | 47,000 | 49,000 |
| $\overline{Mw}$ | 38,000 | 89,000 | 130,000 |
| $\overline{Mw}/\overline{Mn}$ | 3.10 | 1.90 | 2.71 |
| Cyclohexane extraction (insolubles:solubles) | 89:11 | 91:9 | 95:5 |
| Copolymer composition (wt. %) (PS:PAr) | 45:55 | 47:53 | 48:52 |

(Notes)
PS: Polystyrene segments, PAr: Polyarylate segments

EXAMPLES 4–6

Each carboxyl-terminated polystyrene (100 parts by weight) synthesized in Examples 1 to 3 was dissolved in dichloromethane, 3 to 7 parts by weight of p-xylenediamine was added, then 7 to 15 parts by weight of N,N'-dicyclohexylcarbodiimide was added, and the mixture was allowed to react at room temperature for approximately 4 hours in a stream of nitrogen to effect amidation and yield three kinds of amino-terminated polystyrene (A-4, A-5, and A-6). The number of terminal amino groups was determined from that of the unreacted carboxyl groups. The results are shown in Table 3.

Into an egg plant type flask fitted with a stirrer were introduced 100 parts by weight of amino-terminated polystyrene A-4, A-5, or A-6 synthesized above and 29 parts by weight each of terephthaloyl chloride and isophthaloyl chloride and dissolved in 1,000 parts by weight of dichloromethane, 0.1 part by weight of calcium hydroxide and 0.01 part by weight of triethylamine were added as catalyst, and the mixture was stirred for 1 hour to condense preferentially the styrene polymers and the acid chlorides, and a resultant mixture including acid chloride-terminated styrene polymers (A'-1~A'-3) was yielded. Then, this resultant mixture was not separated but used continuously for the next reaction. Separately, 630 parts by weight of an aqueous 1N sodium hydroxide solution was introduced into a round-bottomed flask fitted with a stirrer, 64 parts by weight of bisphenol A was dissolved in the alkaline solution, 0.05 part by weight of trimethylbenzylammonium chloride was added as catalyst, and to the resultant solution was added the solution of styrene polymer and acid chloride obtained above. Upon completion of the adding, the resultant mixture was subjected to interfacial polymerization with stirring for 2 hours.

Upon completion of the polymerization, the organic layer was neutralized with 630 parts by weight of an aqueous 1N acetic acid solution, washed, and the organic layer was extracted and dissolved in 1,000 parts by weight of chloroform. The chloroform solution was passed through a filter with 1 μm pores and the filtrate was added to 10,000 parts by weight of methanol to precipitate the polymers. The polymers were collected by filtration, washed with methanol, and dried in a vacuum dryer.

The polymers thus obtained was tested for their properties as in Examples 1 to 3. The results are shown in Table 3.

COMPARATIVE EXAMPLE 1

Methacryloyl-terminated polyesters were prepared by the interfacial polymerization of a methylene chloride solution of 203 g. of a 1:1 mixture by mole of terephthaloyl chloride and isophthaloyl chloride and 4.18 g. of methacryloyl chloride and an aqueous sodium hydroxide solution of 233 g. of bisphenol A according to the procedure described in an example in Japan Kokai Tokkyo Koho No. 58-157,844 (1983). The number average molecular weight $\overline{Mn}$ was 4,000 as determined by GPC.

The polyesters thus prepared were stirred with styrene monomer at a mix ratio of 1:1 by weight in an atmosphere of nitrogen at 130° C. for 20 hours to effect polymerization. The polymers formed were recovered and submitted to the determination of the molecular weight, composition, and uncopolymerized polystyrene content as in Examples 1 to 3. The results are shown in Table 3.

TABLE 3

| | Example | | | Comparative example 1 |
|---|---|---|---|---|
| | 4 | 5 | 6 | |
| Carboxyl-terminated polystyrene | A-1' | A-2' | A-3' | — |
| Amino-terminated polystyrene | A-4 | A-5 | A-6 | — |
| Number of amino groups in one molecule | 1.20 | 1.65 | 1.80 | — |
| Properties of polymers | | | | |
| $\overline{Mn}$ | 13,000 | 45,000 | 48,000 | 7,500 |
| $\overline{Mw}$ | 38,000 | 88,000 | 120,000 | 22,000 |
| $\overline{Mw}/\overline{Mn}$ | 2.92 | 1.96 | 2.50 | 2.91 |
| Cyclohexane extraction (insolubles:solubles) | 88:12 | 92:8 | 98:2 | 30:70 |
| Copolymer composition (wt. %) (PS:PAr) | 45:55 | 48:52 | 49:51 | 25:75 |

EXAMPLE 7

Into an egg plant type flask fitted with a stirrer were introduced 100 parts by weight of phenolic hydroxyl-terminated polystyrene (A-1) synthesized in Example 1 and 29 parts by weight each of terephthaloyl chloride and isophthaloyl chloride and dissolved in 1,000 parts by weight of dichloromethane.

Separately, 630 parts by weight of an aqueous 1N sodium hydroxide solution was introduced into a round-bottomed flask fitted with a stirrer, 64 parts by weight of bisphenol A was dissolved in the alkaline solution, and 0.05 part by weight of trimethylbenzylammonium chloride was added as catalyst. To the resulting solution was added a solution of the previously prepared polystyrene (A-1), terephthaloyl chloride, and isophthaloyl chloride and the mixture was stirred for 2 hours to effect interfacial polymerization.

Upon completion of the polymerization, the organic layer was neutralized with 630 parts by weight of an aqueous 1N acetic acid solution and washed and the organic layer was extracted and dissolved in 1,000 parts by weight of chloroform. The chloroform solution was passed through a filter with 1- μm pores and the filtrate was added to 10,000 parts by weight of methanol to precipitate the polymers. The polymers were collected by filtration, washed with methanol, and dried in a vacuum dryer.

The polymers thus obtained were tested for their properties as in Example 1. The results indicate that the number average molecular weight ($\overline{Mn}$) is 45,000, the weight average molecular weight ($\overline{Mn}$) is 150,000, $\overline{Mw}/\overline{Mn}$ is 3.53, the conversion of polystyrene is 32%, and the copolymer composition (PS:PAr) by weight % is 23:77.

EXAMPLE 8

Into an egg plant type flask fitted with a stirrer were introduced 100 parts by weight of amino-terminated polystyrene (A-6) synthesized in Example 6 and 29 parts by weight each of terephthaloyl chloride and isophthaloyl chloride and dissolved in 1,000 parts by weight of dichloromethane.

Separately, 630 parts by weight of an aqueous 1N sodium hydroxide solution was introduced into a round-bottomed flask fitted with a stirrer, 64 parts by weight of bisphenol A was dissolved in the alkaline solution, 0.05 part by weight of trimethylbenzylammonium chloride was added as catalyst, and the same procedure as that for Examples 4 to 6 was followed thereafter except adding the acid chloride solution prepared immediately above.

The polymers thus obtained were tested for their properties as in Example 1. The results indicate that the number average molecular weight ($\overline{Mn}$) is 47,000, the weight average molecular weight (Mw) is 115,000, $\overline{Mw}/\overline{Mn}$ is 2.45, the conversion of polystyrene is 74%, and the copolymer composition (PS:PAr) by weight % is 31:69.

EXAMPLE OF POLYMER PROCESSING

Each of the polymers synthesized in Examples 1 to 8 was dissolved in methylene chloride to a concentration of 20% by weight and formed into a 100 μm-thick film on a glass plate with the aid of Automatic Film Applicator No. 542-AB-S manufactured by Yasuda Seiki Seisakusho Ltd. The film was left at room temperature for 12 hours and then stripped of the solvent by heating in a vacuum dryer at 100° C. for 12 hours.

The film stripped of the solvent was cooled to room temperature, left immersed in water, and peeled off the glass plate. The film came off the glass plate with no damage at all to furnish a sample, 20 mm×60 mm, for the stretching test.

The film was stretched 10 to 50% at 215° to 220° C. in a hot-air circulation type uniaxial stretching machine manufactured by Satake Chemical Equipment Mfg. Co., Ltd. and the birefringence of the film was determined at 546 nm by an optical-pol polarizing microscope manufactured by Nikon Corporation. The results are shown in Table 4.

The polymers prepared in Comparative Example 1 above were formed into a 100 μm-thick film on a glass plate with the aid of Automatic Film Applicator No. 542-AB-S manufactured by Yasuda Seiki Seisakusho Ltd. and the film was left at room temperature for 12 hours and then stripped of the solvent by heating in a vacuum dryer at 100° C. for 12 hours.

The film was torn in pieces and could not furnish a sample for the stretching test when it was cooled to room temperature, immersed in water, and peeled off.

COMPARATIVE EXAMPLE 2

A film prepared from 100 g. of commercial aromatic polyester (U-Polymer U-100, product of Unitika Ltd.) was submitted to the measurement of birefringence as above. The results are shown in Table 4.

TABLE 4

|  | 10% Stretching | 30% Stretching | 50% Stretching |
| --- | --- | --- | --- |
| Example 1 | 0.55E-2 | 0.63E-2 | 0.68E-2 |
| Example 2 | 0.44E-2 | 0.53E-2 | 0.58E-2 |
| Example 3 | 0.31E-2 | 0.32E-2 | 0.51E-2 |
| Example 4 | 0.54E-2 | 0.64E-2 | 0.69E-2 |
| Example 5 | 0.43E-2 | 0.52E-2 | 0.56E-2 |
| Example 6 | 0.28E-2 | 0.30E-2 | 0.45E-2 |
| Example 8 | 0.59E-2 | 0.68E-2 | 0.79E-2 |
| Comparative example 2 | 1.10E-2 | 1.30E-2 | 2.48E-2 |

The finding in Examples 1 to 8 and Comparative Examples 1 and 2 is summarized as follows.

① The results of Examples 1 to 8 indicate that aromatic polyester-polystyrene block copolymers can be prepared by the process of this invention.

② A comparison of the results of Examples 1 to 8 and those of Comparative Example 1 indicates that the amount of uncopolymerized polystyrene can be reduced by the process of this invention.

③ A comparison of the results of Examples 1 to 8 and those of Comparative Example 2 indicates that the aromatic polyester-polystyrene block copolymers prepared by the process of this invention show low birefringence even when stretched.

As a consequence, the aromatic polyester-polystyrene block copolymers of this invention can be used as good-quality materials for optical instruments and also they can be used as compatibilizer in blending of aromatic polyesters and styrene polymers for the purpose of increasing the tensile strength, flexural strength, and flexural modulus of the blends.

What is claimed is:

1. A process for preparing an aromatic polyester-poly-styrene block copolymer which comprises reacting a styrene polymer having at least one of terminal phenolic hydroxyl groups or terminal amino groups (A) with an excess of an aromatic dicarboxylic acid dihalide (C) to form a mixture containing a polycondensate having terminal acid halide groups, and then without separating the resultant polycondensate from the mixture, interfacially polymerizing the polycondensate and the excess carboxylic acid dihalide in the mixture with an aromatic dihydroxy compound (B), at a ratio of (A)/(B)+(C) of 5/95 to 80/20 by weight.

2. A process for preparing an aromatic polyester-polystyrene block copolymer as claimed in claim 1, wherein the styrene polymer was synthesized from a styrene polymer having terminal carboxyl groups.

* * * * *